(12) United States Patent
Ma

(10) Patent No.: US 7,564,518 B2
(45) Date of Patent: Jul. 21, 2009

(54) REFLECTIVE CHOLESTERIC DISPLAYS EMPLOYING CIRCULAR POLARIZERS WITH THE POLARITY OF THE FRONT POLARIZER OPPOSITE TO BOTH THE BACK POLARIZER AND THE BRAGG REFLECTION

(76) Inventor: Yao-Dong Ma, 14586 Pensham Dr., Frisco, TX (US) 75035

( * ) Notice: Subject to any disclaimer, the term of this patent is extended or adjusted under 35 U.S.C. 154(b) by 59 days.

(21) Appl. No.: 11/152,270

(22) Filed: Jun. 10, 2005

(65) Prior Publication Data

US 2008/0018833 A1 Jan. 24, 2008

(51) Int. Cl.
*G02F 1/1335* (2006.01)
*C09K 19/02* (2006.01)
(52) U.S. Cl. .................. 349/98; 349/96; 349/113; 349/115; 349/175; 349/176; 349/185
(58) Field of Classification Search .................. 349/98, 349/113, 115, 175, 176, 96, 185
See application file for complete search history.

(56) References Cited

U.S. PATENT DOCUMENTS

| 5,796,454 | A * | 8/1998 | Ma | 349/98 |
| 6,344,887 | B1* | 2/2002 | Ma et al. | 349/98 |
| 2003/0160923 | A1* | 8/2003 | Ma | 349/115 |
| 2003/0231266 | A1* | 12/2003 | Ma | 349/113 |
| 2003/0231269 | A1* | 12/2003 | Ma | 349/115 |

* cited by examiner

*Primary Examiner*—Frank G Font
*Assistant Examiner*—Jerry Blevins

(57) ABSTRACT

This invention relates to a high brightness and high contrast ratio reflective cholesteric displays employing circular polarizers. The front circular polarizer has a predetermined polarity that is opposite both to the Bragg reflection of the display and to the back reflective circular polarizer. An absorptive weak polarizer with high transmittance is adopted in the display system. In the black-and-white display mode, the white state is achieved in the cholesteric focal conic texture area; and the black state is obtained in the cholesteric planar texture area. In the full color mode, the full color state is created by the micro-color filter in the cholesteric focal conic texture area; and the black state is realized in the cholesteric planar texture area.

14 Claims, 4 Drawing Sheets

REFLECTIVE CHOLESTERIC DISPLAYS EMPLOYING CIRCULAR POLARIZERS WITH THE POLARITY OF THE FRONT POLARIZER OPPOSITE TO BOTH THE BACK POLARIZER AND THE BRAGG REFLECTION

BACKGROUND OF THE INVENTION

Cholesteric liquid crystal displays are characterized by the fact that the pictures stay on the display even if the driving voltage is disconnected. The bistability and multistability also ensure a completely flicker-free static display and have the possibility of infinite multiplexing to create giant displays and/or ultra-high resolution displays. In cholesteric liquid crystals, the molecules are oriented in helices with a periodicity characteristic of material. In the planar state, the axis of this helix is perpendicular to the display plane. Light with a wavelength matching the pitch of the helix is reflected and the display appears bright. If an AC-voltage is applied, the structure of the liquid crystals changes from planar to focal conic texture. The focal conic state is predominately characterized by its highly diffused light scattering appearance caused by a distribution of small, birefringence domains, at the boundary between those domains the refractive index is abruptly changed. This texture has no single optic axis. The focal conic texture is typically milky-white (i.e., white light scattering). Both planar texture and focal conic texture can coexist in the same panel or entity. This is a very important property for display applications, whereby the gray scale can be realized.

Current cholesterics displays are utilizing "Bragg reflection", one of the intrinsic properties of cholesterics. In Bragg reflection, only a portion of the incident light with the same handedness of circular polarization and also within the specific wave band can reflect back to the viewer, which generates a monochrome display. The remaining spectrum of the incoming light, however, including the 50% opposite handedness circular polarized and out-off Bragg reflection wave band, will pass through the display and be absorbed by the black coating material on the back surface of the display to ensure the contrast ratio. The overall light utilization efficiency is rather low and it is not qualified in some applications, such as a billboard at normal ambient lighting condition. The Bragg type reflection gives an impression that monochrome display is one of the distinctive properties of the ChLCD.

In many applications, human eyes are friendlier with full color spectrum, i.e., white color information written on the dark background. With the development of the flat panel display, more and more displays with neutral color have come into being, such as black-and-white STN display and AMTFT display, etc. Unfortunately, both of these approaches involve major disadvantages and limitations. The AMTFT displays are not true zero field image storage systems because they require constant power input for image refreshing. The STN displays do not possess inherent gray scale capability as a result of the extreme steepness of the electro-optical response curve of the display. To realize a gray scale, the resolution has to be reduced by using, for example, four pixels instead of one per area. Anywhere from one to four pixels are activated at a particular time to provide the gray scale effect. The AMTFT devices use semiconductors to provide memory effects and involve use of expensive, ultra high resistance liquid crystal materials to minimize RC losses. Additionally, these displays are both difficult and costly to produce and they are, at present, limited to relatively small size displays. The cholesteric display has many advantages over the STN and AMTFT display with its zero field memory effect, hemispheric viewing angle, gray scale capability and other optical performances, but it obviously needs to develop black-and-white solution in order to keep its superiority.

U.S. Pat. No. 5,796,454 introduces a black-and-white back-lit ChLC display. It includes controllable ChLC structure, the first circular polarizer laminating to the first substrate of the cell which has the same circular polarity as that of the liquid crystals, the second circular polarizer laminating to the second substrate of the cell which has a circular polarity opposite to the liquid crystals, and a light source. The black-and-white back-lit display is preferably illuminated by a light source that produces natural "white" light. Thus, when the display is illuminated by incident light, the circular polarizer transmits the 50% component of the incident light that is right-circularly polarized. When the ChLC is in an ON state, the light reflected by the ChLC is that portion of the incident light having wavelengths within the intrinsic spectral bandwidth, and the same handedness; The light that is transmitted through the ChLC is the complement of the intrinsic color of ChLC. The transmitted light has right-circular polarization, however, it is thus blocked by left-circular polarizer. Therefore, the observer will perceive that region of the display to be substantially black. When the display is in an OFF state, the light transmitted through the polarizer is optically scattered by the ChLC. The portion of the incident light that is forward-scattered is emitted from the controllable ChLC structure as depolarized light. The left-circularly polarized portion of the forward-scattered light is transmitted through the left-circular polarizer, thus, is perceived by an observer. The black-and-white display, in '454 patent, is generated by back-lit component and the ambient light is nothing but noise.

U.S. Pat. No. 6,344,887 introduces a method of manufacturing a full spectrum reflective cholesteric display, herein is incorporated by reference. '887 teaches a cholesteric display employing polarizers with the same polarity as liquid crystals.

The display takes advantages of two reflections: Bragg reflection (the first reflection) and metal reflection (the second reflection). The display utilizes a circular polarizer and a metal reflector film positioned on the backside of the display to guide the second component of the incoming light back to the viewer.

U.S. Pat. No. 6,873,393 introduces a method of fabricating a black and white or color cholesteric display without using Bragg reflection, herein is incorporated by reference. '393 teaches a cholesteric display employing front polarizer with the opposite polarity to that of liquid crystals.

The function of the display cell structure is merely a light shutter to switch the incident light ON and OFF. In the black-and-white display mode, the white state is achieved from the metal reflection in the cholesteric planar texture area; and the black state is obtained by cholesteric's depolarization effect and polarizer's filtration effect in the cholesteric focal conic texture area. In the full color mode, the full color state is created by the metal reflector and the micro-color filter in the cholesteric planar texture area; and the black state is realized in the cholesteric focal conic texture area.

SUMMARY OF THE INVENTION

It is the primary objective of the present invention to realize a high contrast ratio wide viewing angle black-and-white display.

It is another object of the present invention to achieve display performances, such as brightness, whiteness and contrast ratio, totally comparable to or better than that of newspaper.

It is also another object of the present invention to make a weak polarizer film with the single transmission in the range of 44%~70%.

It is still another objective of the present invention to create a bright white state in display's focal conic texture.

It is also another objective of the present invention to create a dark black state in display's planar texture.

It is another further objective of the present invention to accomplish a neutral full color display.

DETAILED DESCRIPTION

Figure 1:
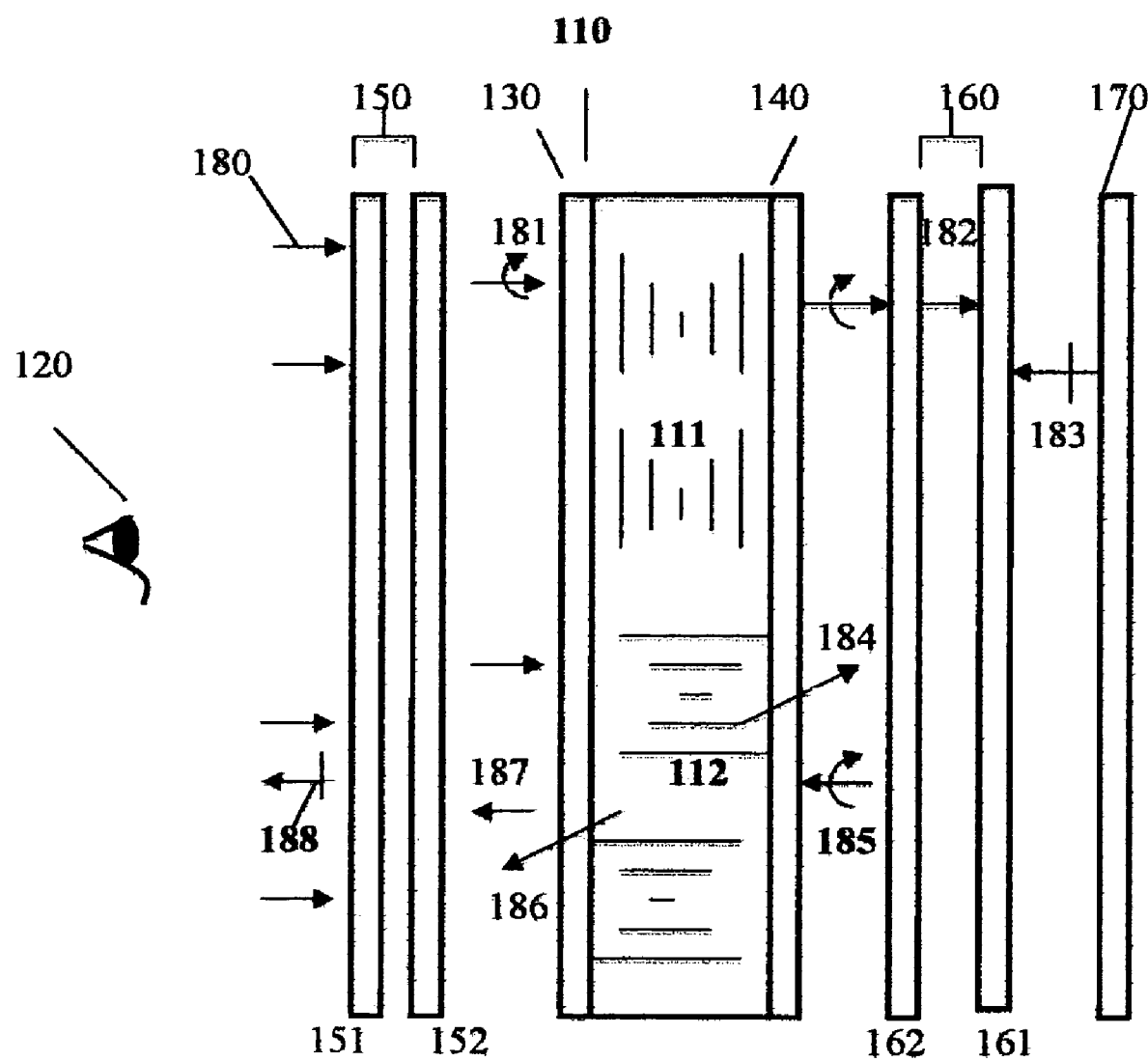
FIG. 1 shows a schematic structure of a reflective black and white display with circular polarizers and reflector.

Referring first to FIG. 1, illustrated is a reflective black-and-white cholesteric display structure laminated with a front circular polarizer (FCP), a back circular polarizer (BCP) and a metal reflector. The FCP is made of an optimal retarder laminated with linear polarizer film in an optional angle. The BCP is made of thin retarder and thin polarizer with the total thickness less than 0.3 mm. A natural light 180 first reaches the FCP 150 with the opposite handedness to that of liquid crystal material 110, and to the back circular polarizer BCP, for example, the right handed circular polarizer (RHCP) and left handed circular polarizer (LHCP) for the convenience of description.

As the FCP has the opposite handedness both to that of the liquid crystal material 111 and the BCP, the Bragg reflection from the planar texture will be completely cut off, regardless whether the Bragg reflection is selected in the visible wavelength or in the invisible wavelength. When the Bragg reflection is designed in UV wave band, the reflection will be cut off by the UV absorbing agent in the front CP. When the Bragg reflection is designed in visible and near infrared wave band, the reflection will be cut off by the FCP itself. When the natural light hits on the FCP 150, approximately 50% right handed 181 is allowed to pass. Due to the opposite handedness to the left handed LC material in the planar texture 111, all the RH light will pass through the ChLC cell structure without substantial attenuation. The light 182 will then be absorbed by the BCP 160. The light activities around the BCP can be further described as follows. Right-handed light passing through the retarder 162 becomes a linear polarization 182. Because of the opposite polarity, the orthogonally arranged linear polarizer 161 will absorb the linear polarization. Thus, the display in planar texture area will take on a black dark optical OFF state.

As the display structure addressed in a focal conic texture 112, the display works at optical ON state. The incident light 180 reaches the FCP 150 and half of it will be cut off. The rest of it 181 gets to the ChLC cell with focal conic texture 112 and is depolarized by the scattering effect of the LC material into a non-polarized light 184. As the neutral non-polarized light 184 hits on the BCP and the metal reflector, roughly 50% left handed polarized light will be reflected back and the other 50% right handed light will be absorbed by the BCP. The remaining light passes the ChLC cell again and becomes depolarized light 187 due to the same focal conic scattering effect. The back scattered light 186 as well as the non-polarized light 187 reach the FCP and then finally emerge to the viewer 120 as linear polarization 188.

It is noticed that the brightness of the display or the intensity of the light 188 depends on the following parameters. Firstly, the transmittance of front and back linear polarizer 151 and 161 plays an important role. It is preferred to choose the transmission of the linear polarizer in the range of 48%~70% while maintaining the polarization efficiency as high as possible. Secondly, the profile of the metal reflector should be ensuring a high reflection in a large diffusive cone. Specula or mirror surface of the metal reflector is necessary to ensure the black dark state in planar texture area and the bright white state in the focal conic texture area. It is well known that the focal conic texture is able to work as a good diffuser to the specula reflection from the metal reflector.

Figure 2:
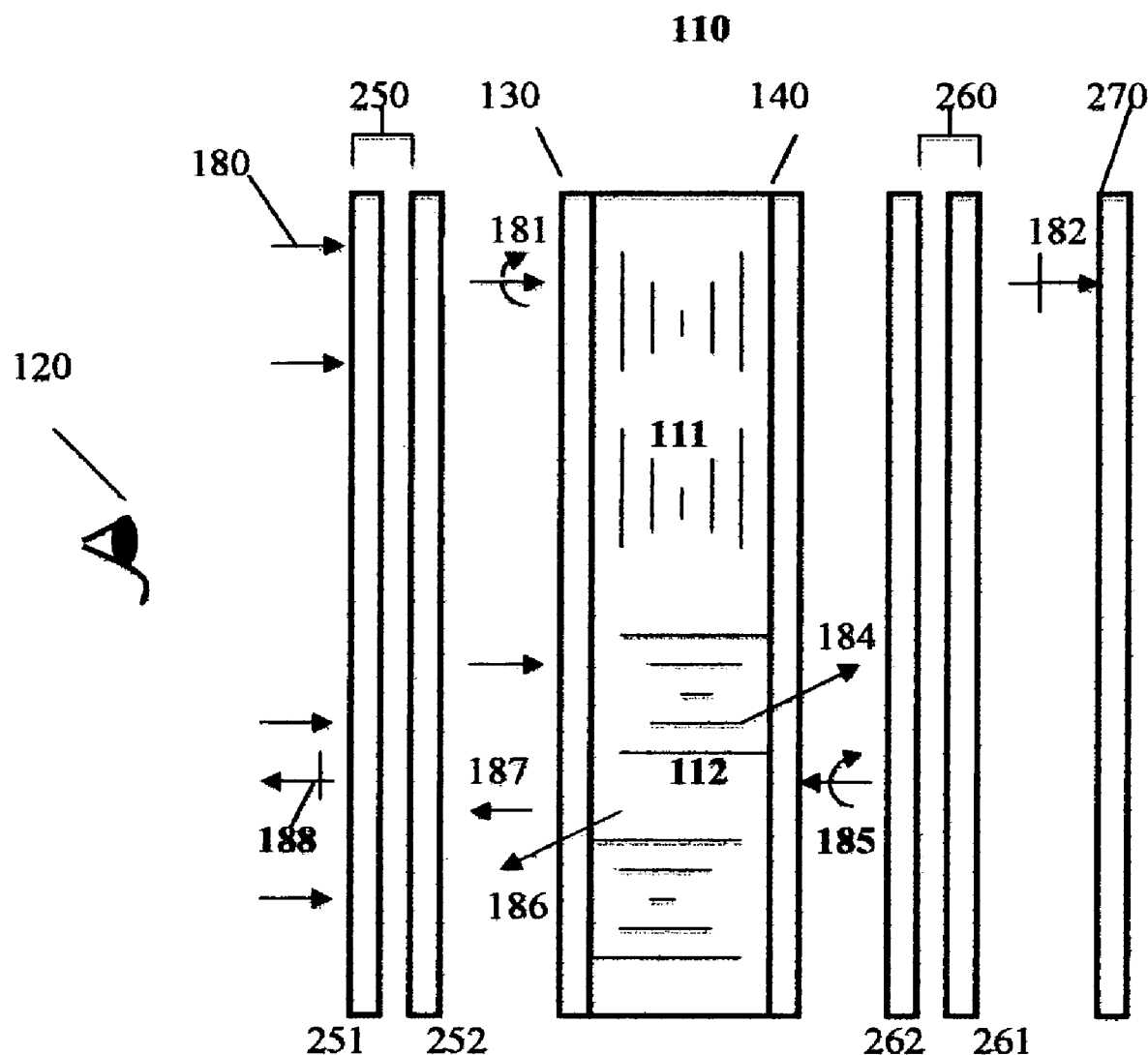
FIG. 2 shows a schematic structure of a reflective black and white display with back reflective circular polarizer.

Turning now to FIG. 2, illustrated is a reflective black-and-white cholesteric display structure laminated with a front circular polarizer (FCP) 250, a back reflective circular polarizer (RCP). The FCP 250 is made of quarter wave retarder 252 laminated with linear polarizer film 251 in an optional angle. The RCP is made of a quarter wave retarder 262 and a reflective linear polarizer 261. A black coating layer 270 is attached to the back surface the reflective polarizer. A natural light 180 first reaches the FCP 250 with the opposite handedness to that of liquid crystal material 110, for example, the right handed circular polarizer (RHCP) for the convenience of description.

As the FCP 250 has the opposite handedness both to that of the liquid crystal material 111 and the RCP, the Bragg reflection from the planar texture will be completely cut off, regardless whether the Bragg reflection is selected in the visible wavelength or in the invisible wavelength. When the Bragg reflection is designed in UV wave band, the reflection will be cut off by the UV absorbing agent in the front CP. When the Bragg reflection is designed in visible and near infrared wave band, the reflection will be cut off by the FCP itself. When the natural light hits on the FCP 250, approximately 50% right handed 181 is allowed to pass. Due to the opposite handedness to the left handed LC material in the planar texture 111, all the RH light will pass through the ChLC cell and the LH reflective circular polarizer RCP 260 structure without substantial attenuation. The light 182 will then be absorbed by the black coating layer 270. The light activities around the RCP can be further described as follows. RH light passing the retarder 162 becomes a linear polarization 182. Because of the opposite polarity, the orthogonal arranged linear polarizer 161 will let the linear polarization to pass through without any reflection. The black coating layer on the backside of the RCP film finally absorbs the orthogonal component. Therefore, the display in planar texture area will take on a black dark optical OFF state.

As the display structure addressed in a focal conic texture 112, the display works at optical ON state. The incident light 180 reaches the FCP 250 and half of it will be cut off. The rest of it 181 gets to the ChLC cell with focal conic texture 112 and is depolarized by the scattering effect of the LC material into a non-polarized light 184. As the neutral non-polarized light 184 hits on the RCP, roughly 50% left handed polarized light will be reflected back and the other 50% right handed light will be absorbed by the black coating layer 270. The remaining light passes the ChLC cell again and becomes depolarized light 187 due to the same focal conic scattering effect The back scattered light 186 as well as the non-polarized light 187 reaches the FCP and then emerges to the viewer 120 as linear polarization.

Figure 3:
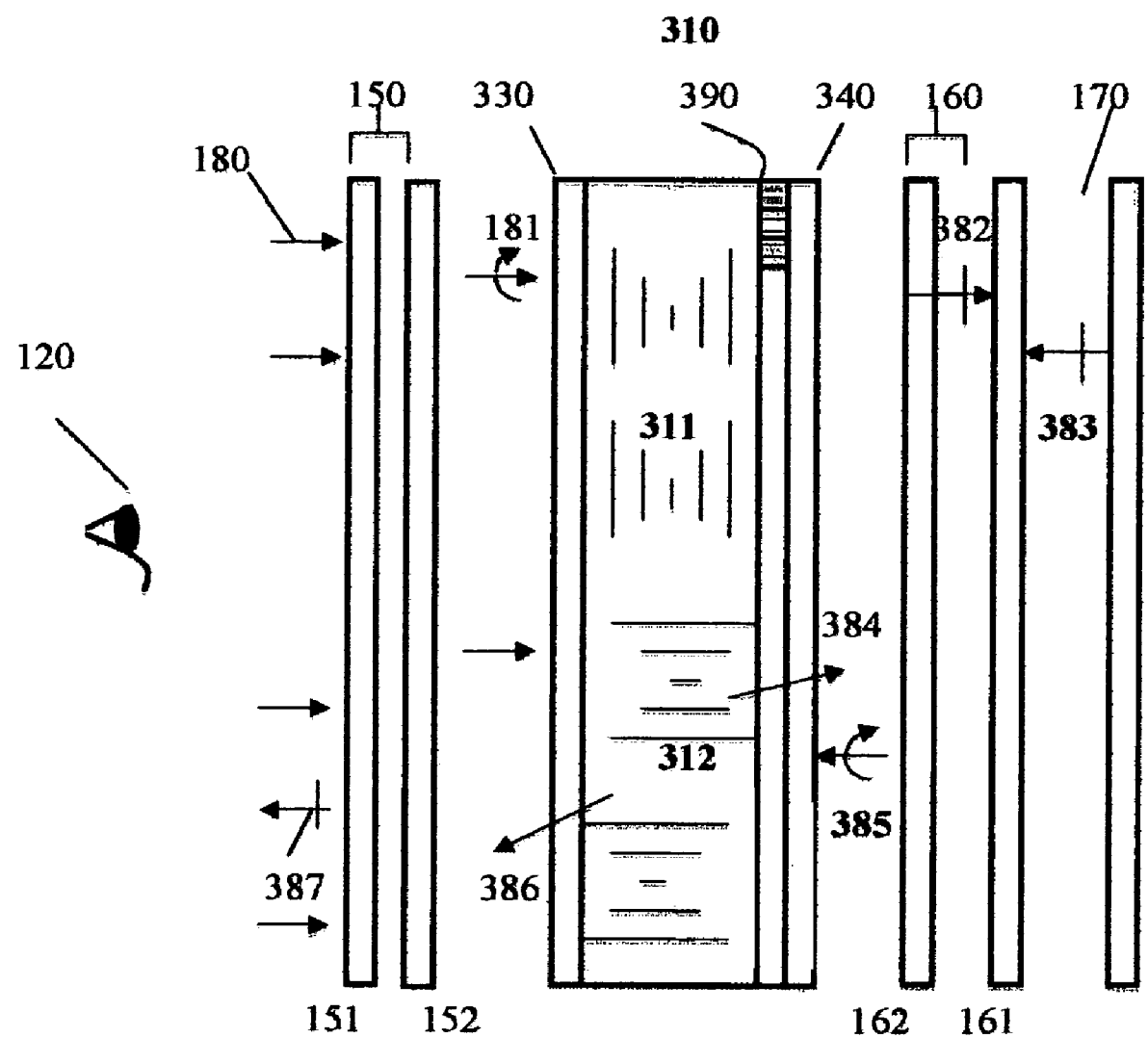
FIG. 3 shows a schematic display structure of a reflective full color display.

Turning now to FIG. 3, illustrated is a sectional structure of a full color display where an absorptive color filter 390 is deposited on the back substrate 340. The micro color filter array, corresponding to the sub-pixel of the dotted electrode, is a red, green and blue pigment patterning deposited onto the back substrate of the display cell structure. In the reflective mode, the thickness of the color filter is usually in the range of 0.6~0.8 μm. A reflective color filter layer, for instance, a cholesteric polymer color filter may also be used in this full color display mode as long as the polarity of the material meets the requirement. FCP 150 has opposite polarity to that of the BCP 160 and the cholesteric liquid crystals inside the display cell 310. The Bragg reflection out of 310 will be cut off by the FCP 150, so that the color information is merely generated by the metal reflector 170 and the color filter 390. Full color optical OFF state takes on in the planar texture area, and black optical ON state in the focal conic texture area respectively.

As the FCP has the opposite handedness both to that of the liquid crystal material 311 and the BCP, the Bragg reflection from the planar texture will be completely cut off, regardless whether the Bragg reflection is selected in the visible wavelength or in the invisible wavelength. When the Bragg reflection is designed in UV wave band, the reflection will be cut off by the UV absorbing agent in the FCP. When the Bragg reflection is designed in visible and near infrared wave band, the reflection will be cut off by the FCP's dichroic absorption. When the natural light hits on the FCP 150, approximately 50% right handed 181 is allowed to pass. Due to the opposite handedness to the left handed LC material in the planar texture 311, all the RH light will pass through the ChLC cell structure without substantial attenuation. The colored light 382 will then be absorbed by the BCP 160. The light activities around the BCP can be further described as follows. Right-handed light passing through the retarder 162 becomes a linear polarization 182. Because of the opposite polarity, the orthogonal arranged linear polarizer 161 will absorb the linear polarization. Thus, the display in planar texture area will take on a black dark optical OFF state.

As the ChLC display structure addressed in a focal conic texture 312, the display works at optical ON state. The incident light 180 reaches the FCP 150 and half of it will be cut off. The rest of it 181 gets to the ChLC cell with focal conic texture 312 and is depolarized by the scattering effect of the LC material into a non-polarized color light 384. As the colored non-polarized light 384 hits on the BCP and the metal reflector, 50% left handed polarized light will be reflected back and the other 50% right handed polarized light will be absorbed by the BCP. The remaining light passes the ChLC cell again where it becomes depolarized light 386 due to the same focal conic scattering effect. The non-polarized light 386 then reaches the FCP and finally emerges to the viewer 120 as colored linear polarization 387.

Figure 4:
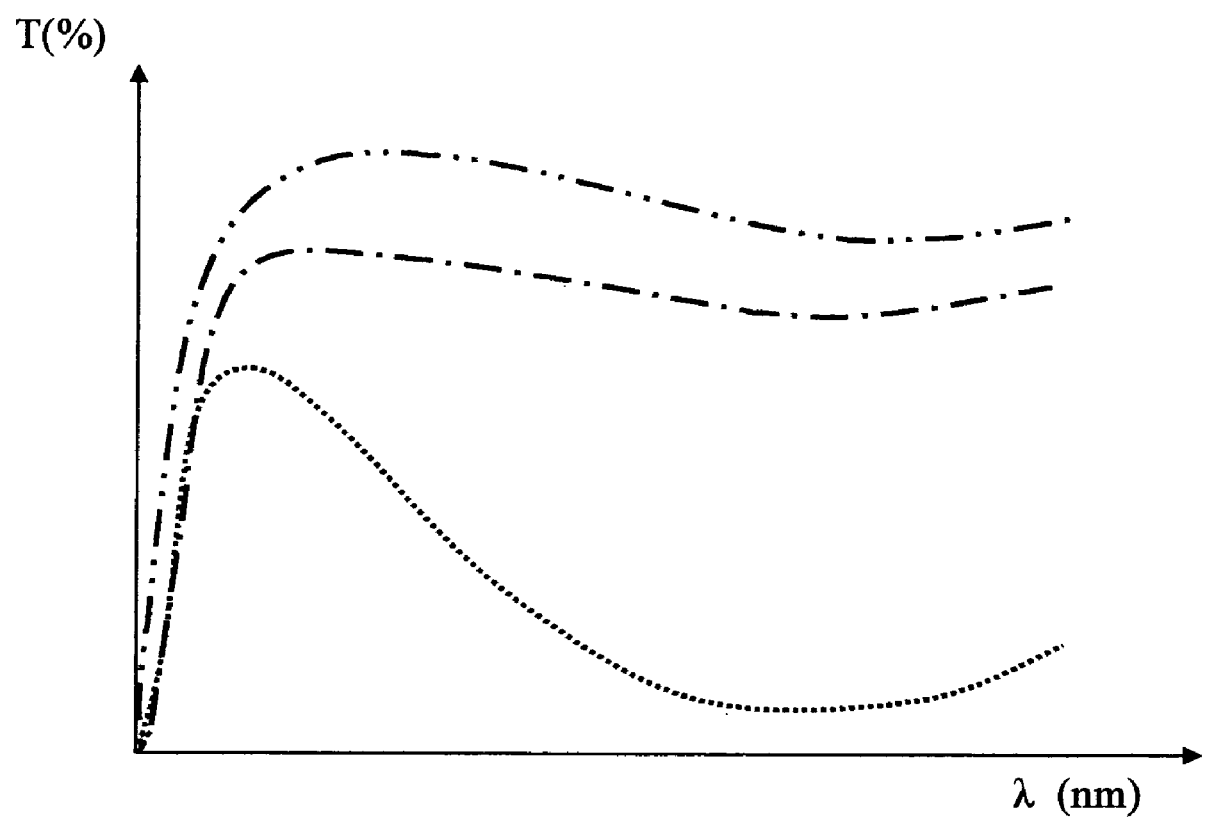
FIG. 4 shows an optical curve of a weak polarizer.

Turning now to FIG. 4, illustrated is a group of curves of a newly developed weak polarizer. In order to accomplish super whiteness of the cholesteric display, which is whiter than newspaper, we have designed and manufactured an iodine type weak polarizer film with very high transmission. The curve on the top is a single transmission, which is the transmission of a ray of ordinary light passing through a single layer polarizer. The middle one is the parallel transmission, which means that the transmission of the two layers of similar polarizers placed together with their optical axis aligned in parallel. While the bottom one is the cross transmission which reflects the transmission of two similar polarizers placed together with their optical axis aligned in cross-position. It can be easily realized that the new iodine polarizer has a very high single transmission: in the blue wavelength 473 nm, the transmission is 60.33%, while in the whole visible wavelengths, 54.6%. It is the first time in LCD history that we adopt a weak polarizer as a display component with such high transmittance and still get satisfactory display result. Table 1 releases the related data of the polarizer.

TABLE 1

|  | Trans. | Efficiency | X | Y | Z | L | a* | b* | ΔE |
|---|---|---|---|---|---|---|---|---|---|
| Single | 54.6% | 65% | 49.3 | 53.0 | 65.8 | 77.9 | −2.8 | −7.2 | 7.7 |
| Parallel | 42.65 | Dichroic R 15.7 | 39.8 | 42.3 | 48.3 | 71.1 | −0.6 | −2.4 | 2.4 |
| Cross | 17.3% |  | 11.7 | 13.9 | 31.1 | 44.1 | −10.7 | −28.1 | 30.1 |

EXPERIMENT 1

In the experiment, a Topcon BM-7 photometer made in Japan was used as the tester. The distance between the instrument and the testing sample was 35 cm and the angle of the testing was perpendicular or 0 degree. The test was carried out in a clean room environment.

A newspaper was tested in terms of blackness, whiteness and contrast ratio in both the graphic area and the character area. The results are shown in TABLE 2.

TABLE 2

| No | Black | White | CR |
|---|---|---|---|
| Graphic | 50 | 211.4 | 4.23 |
| Character | 82.54 | 215.9 | 2.62 |

EXPERIMENT 2

In the experiment, a Topcon BM-7 photometer was used as the tester. The distance between the instrument and the testing sample was 35 cm and the angle of the testing was perpendicular or 0 degree.

A standard polarizer with single transmission of 44.0 and polarization efficiency 99.9% was used as linear polarizer. A retardation film with the retardation rate of 140 nm was laminated with the linear polarizer with 45 degree. Then the front circular polarizer was made left-handed and the back one right-handed. The liquid crystal material was right-handed choleterics with the Bragg reflection wavelength, $\lambda=570$ nm.

A 6.4-inch diagonal cholesteric E-Book with 640×480 pixel array was made according the configuration of the polarizers and the cell structure. The experiment was carried out at the same time and in the same environmental conditions as indicated in experiment 1. And the result is shown in TABLE 3.

TABLE 3

| No | Black | White | CR |
|---|---|---|---|
| 1 | 7.711 | 100 | 12.97 |
| 2 | 7.755 | 99.88 | 12.89 |
| 3 | 7.679 | 99.34 | 12.94 |
| 4 | 7.824 | 99.74 | 12.75 |
| Average | 7.74 | 99.74 | 12.88 |

EXPERIMENT 3

In the experiment, a Topcon BM-7 photometer was used as the tester. The distance between the instrument and the testing sample was 35 cm and the angle of the testing was perpendicular or 0 degree.

Two newly special designed polarizers were used in the experiment. The first polarizer has higher transmission as shown in FIG. 4. The single transmission is 54.6% and polarization efficiency is 65%. The second polarizer was a little darker with single transmission of 50.0% and polarizing efficiency 75%. The first one was used as the front polarizer and the second on as the back polarizer. A retardation film with the retardation rate of 168 nm was laminated with those two linear polarizers with 45 degree respectively. Thus, the front circular polarizer was made left-handed by using the lower transmission linear polarizer and the back one was made right-handed by using the higher transmission linear polarizer. A mirror coated Aluminum film was laminated on the polarizer side of the back circular polarizer. The liquid crystal material was right-handed choleterics with the Bragg reflection wavelength, $\lambda$=570 nm.

A 6.4-inch diagonal cholesteric E-Book with 640×480 pixel array was made according the configuration of the polarizers and the cell structure. The experiment was carried out at the same time and the same environmental conditions as the experiment 1. And the result shown in TABLE 4.

TABLE 4

| No | Black | White | CR |
|---|---|---|---|
| 1 | 25 | 225 | 9.02 |

As a result, the whiteness and the contrast ratio of the black-and-white reflective display, as indicated in this experiment, are much better than that of the newspaper. The whiteness of the display is better than that of the newspaper. And the contrast ratio is more than twice as much as that of the newspaper.

I claim:

1. A reflective display comprising:
   a. a front circular polarizer, and
   b. a cholesteric display cell structure with at least one controllable planar texture area and one controllable focal conic texture area, and
   c. a back reflective circular polarizer,
   wherein the front circular polarizer has exactly opposite polarity both to the Bragg reflection from the cholesteric display cell structure and to the back reflective circular polarizer: in planar texture area, the front circular polarizer substantially eliminates the Bragg reflection from the cholesterics and the reflection from the back reflective circular polarizer, in focal conic texture area, due to the depolarization effect, the circular polarizers lead the front light passing through and emerging to the viewer, whereby a black optical state takes on the controllable planar texture area, and a white optical state takes on the controllable focal conic texture area.

2. The reflective display as in claim 1 wherein the front circular polarizer is a weak absorptive polarizer with single transmission in the range of 44%~70%.

3. The reflective display as in claim 1 wherein the back reflective circular polarizer is made of an absorptive circular polarizer and a reflector.

4. The reflective display as in claim 3 wherein the reflector is a specula reflector.

5. The reflective display as in claim 1 wherein the back reflective circular polarizer is made of a reflective linear polarizer and a quarter wave retarder.

6. The reflective display as in claim 5 wherein the reflective linear polarizer is a specula polarizer.

7. The reflective display as in claim 1 wherein the back reflective circular polarizer is a cholesteric polymer film.

8. The reflective display as in claim 1 is a high contrast, pure black-and-white display.

9. The reflective display as in claim 1 wherein the cholesteric cell structure further including a color filter layer with a predetermined multicolor array.

10. The reflective display as in claim 9 wherein the color filter layer is an absorptive coloring film.

11. The reflective display as in claim 9 wherein the color filter layer is a reflective coloring film.

12. The reflective display as in claim 1 is a parallax-free display.

13. The reflective display as in claim 1 is an intrinsically wide viewing angle display.

14. The reflective display as in claim 1 is a paper-like display.

* * * * *